United States Patent
Miyake

(10) Patent No.: US 11,885,440 B2
(45) Date of Patent: Jan. 30, 2024

(54) LAMINATED RUBBER HOSE AND METHOD FOR MANUFACTURING THE SAME

(71) Applicant: KURASHIKI KAKO CO., LTD., Kurashiki (JP)

(72) Inventor: Yuya Miyake, Kurashiki (JP)

(73) Assignee: KURASHIKI KAKO CO., LTD., Kurashiki (JP)

( * ) Notice: Subject to any disclaimer, the term of this patent is extended or adjusted under 35 U.S.C. 154(b) by 459 days.

(21) Appl. No.: 16/863,937

(22) Filed: Apr. 30, 2020

(65) Prior Publication Data

US 2020/0362994 A1 Nov. 19, 2020

(30) Foreign Application Priority Data

May 16, 2019 (JP) .................................. 2019-092573

(51) Int. Cl.
| | |
|---|---|
| *F16L 11/08* | (2006.01) |
| *C08L 9/02* | (2006.01) |
| *C08L 11/00* | (2006.01) |
| *C08J 5/12* | (2006.01) |
| *C08L 23/16* | (2006.01) |

(52) U.S. Cl.
CPC ............ *F16L 11/085* (2013.01); *C08J 5/122* (2013.01); *C08L 9/02* (2013.01); *C08L 11/00* (2013.01); *C08L 23/16* (2013.01); *C08J 2309/02* (2013.01); *C08J 2311/00* (2013.01); *C08J 2323/16* (2013.01); *C08J 2411/00* (2013.01); *C08J 2423/16* (2013.01); *C08J 2461/06* (2013.01); *C08J 2461/20* (2013.01); *C08L 2203/18* (2013.01); *C08L 2205/025* (2013.01); *C08L 2205/035* (2013.01)

(58) Field of Classification Search
CPC ..................................................... F16L 11/085
See application file for complete search history.

(56) References Cited

U.S. PATENT DOCUMENTS

| | | | | |
|---|---|---|---|---|
| 3,840,419 A | * | 10/1974 | De Keyser | B32B 27/00 156/182 |
| 4,356,052 A | * | 10/1982 | Moraw | B29C 66/3472 156/581 |
| 4,905,734 A | | 3/1990 | Ito | |
| 5,660,210 A | | 8/1997 | Ikeda et al. | |
| 6,166,143 A | | 12/2000 | Watanabe et al. | |
| 6,179,008 B1 | | 1/2001 | Kawazura et al. | |
| 6,526,859 B1 | | 3/2003 | Ozawa et al. | |
| 10,221,306 B2 | | 3/2019 | Sugihara | |
| 2003/0213547 A1 | * | 11/2003 | Ono | B29C 48/09 156/149 |
| 2004/0009317 A1 | * | 1/2004 | Ikemoto | F16L 11/085 428/36.91 |
| 2007/0173571 A1 | * | 7/2007 | Sakakura | C08L 33/08 524/492 |
| 2015/0008612 A1 | * | 1/2015 | Ishigaki | B29C 48/919 264/171.12 |
| 2020/0040171 A1 | | 2/2020 | Miki et al. | |

FOREIGN PATENT DOCUMENTS

| | | |
|---|---|---|
| CN | 101007884 A | 8/2007 |
| CN | 104169070 A | 11/2014 |
| CN | 103836275 B | 9/2015 |
| EP | 2075116 A1 | 7/2009 |
| JP | H02-120343 A | 5/1990 |
| JP | H04-64504 B2 | 10/1992 |
| JP | H05-280669 A | 10/1993 |
| JP | H0834886 A | 2/1996 |
| JP | 2692480 B2 | 12/1997 |
| JP | H10-130433 A | 5/1998 |
| JP | H11-80442 A | 3/1999 |
| JP | H11-108261 A | 4/1999 |
| JP | 2004042495 A | 2/2004 |
| JP | 3891718 B2 | 3/2007 |
| JP | 3960362 B2 | 8/2007 |
| JP | 2010164063 | * 7/2010 |
| JP | 5186202 B2 | 4/2013 |
| JP | 2013-199076 A | 10/2013 |
| JP | 2013-202965 A | 10/2013 |
| JP | 5935208 B2 | 6/2016 |
| JP | 2018-065899 A | 4/2018 |
| JP | 2018-075732 A | 5/2018 |

* cited by examiner

Primary Examiner — Irina Krylova
(74) Attorney, Agent, or Firm — Maschoff Brennan

(57) ABSTRACT

Provided is a method for manufacturing a laminated rubber hose that includes a first layer and a second layer laminated on an outer surface of the first layer, the first layer containing a thermosetting resin in an amount of 4.5 parts by mass or less relative to 100 parts by mass of a rubber component, the method including laminating the second layer on the outer surface of the first layer with the outer surface of the first layer maintained at a temperature range of 65° C. or more and 105° C. or less.

9 Claims, 2 Drawing Sheets

LAMINATED RUBBER HOSE AND METHOD FOR MANUFACTURING THE SAME

CROSS-REFERENCE TO RELATED APPLICATION

This application claims priority to Japanese Patent Application No. 2019-092573 filed on May 16, 2019, the entire disclosure of which is incorporated by reference herein.

BACKGROUND

The present disclosure relates to a laminated rubber hose and a method for manufacturing the same.

BACKGROUND ART

Japanese Patent Application Laid-open No. 2013-202965 discloses a method for manufacturing a reinforced hose (a laminated rubber hose). This method of manufacture includes an inner tube rubber formation process (a formation process) extruding a rubber tubular body for forming an inner tube rubber layer (a first layer), a braiding process forming a reinforcing yarn layer (an intermediate layer) on the rubber tubular body to manufacture a hose braided body, and an outer cover rubber formation process (a lamination process) covering the hose braided body with an outer cover rubber material for forming an outer cover rubber layer (a second layer).

SUMMARY

In the method for manufacturing a laminated rubber hose of Japanese Patent Application Laid-open No. 2013-202965, an adhesive containing a volatile organic compound (VOC) such as toluene is applied to the rubber tubular body, and the outer cover rubber layer is laminated on an outer surface of the rubber tubular body.

However, the volatile organic compound is an environmental load substance, and adhesive strength between the two layers is desired to be maintained without using any volatile organic compounds.

The present disclosure has been made in view of the above point, and an object thereof is to maintain the adhesive strength between the two layers without using any volatile organic compounds.

To achieve the above object, in this disclosure, a thermosetting resin is added to a rubber material for a first layer.

Specifically, a first aspect of the present disclosure is a method for manufacturing a laminated rubber hose that includes a first layer and a second layer laminated on an outer surface of the first layer, the first layer containing a thermosetting resin in an amount of 4.5 parts by mass or less relative to 100 parts by mass of a rubber component, the method including a lamination process laminating the second layer on the outer surface of the first layer with the outer surface of the first layer maintained at a temperature range of 65° C. or more and 105° C. or less.

According to this first aspect, the first layer contains the thermosetting resin, and thus intermolecular attraction acts between the thermosetting resin of the first layer and a polymer of a rubber component of the second layer. At the lamination process, the second layer is laminated on the outer surface of the first layer maintained at 65° C. or more, and thus the thermosetting resin of the first layer takes a molecular structure facilitating the action of the intermolecular attraction with the polymer of the rubber component of the second layer. Further, action to soften the first layer by the thermosetting resin is exerted, and the adhesiveness of the first layer to the second layer improves. Consequently, owing to the intermolecular attraction between the thermosetting resin of the first layer and the polymer of the rubber component of the second layer and improvement in the adhesiveness between the two layers, adhesive strength between the two layers is obtained. Consequently, the adhesive strength between the two layers can be maintained without using any volatile organic compounds.

A second aspect of the present disclosure is the first aspect, further including a heating process heating the first layer to make a temperature of the outer surface of the first layer within a temperature range of 65° C. or more and 105° C. or less before the lamination process.

According to this second aspect, the temperature of the outer surface of the first layer can surely be 65° C. or more and 105° C. or less by the heating process performed before the lamination process.

A third aspect of the present disclosure is the first or second aspect, further including a preparation process preparing a rubber material for the second layer containing a thermosetting resin, in which at the lamination process, the second layer is laminated on the outer surface of the first layer from the rubber material.

According to this third aspect, not only the first layer but also the second layer contains the thermosetting resin, and thus intermolecular attraction acts between a polymer of the rubber component of the first layer and the thermosetting resin of the second layer. Further, action to soften the second layer by the thermosetting resin is exerted, and the adhesiveness of the second layer to the first layer improves. Consequently, the adhesive strength between the two layers improves compared with a case in which only the first layer contains the thermosetting resin. Consequently, the adhesive strength between the two layers can be improved without using any volatile organic compounds.

A fourth aspect of the present disclosure is the third aspect, in which the content of the thermosetting resin in the rubber material for the second layer is 4.5 parts by mass or less relative to 100 parts by mass of a rubber component of the rubber material.

According to this fourth aspect, the content of the thermosetting resin in the rubber material for the second layer is 4.5 parts by mass or less relative to 100 parts by mass of the rubber component of the rubber material, and thus crosslinking by the thermosetting resin can moderately be limited, and significant changes in properties and scorch of the rubber (the second layer) can be reduced. Consequently, the rubber properties of the two layers can be maintained while improving the adhesive strength between the two layers without using any volatile organic compounds.

A fifth aspect of the present disclosure is any one of the first to fourth aspects, in which the thermosetting resin contained in the first layer is a phenolic resin.

According to this fifth aspect, the thermosetting resin contained in the first layer is a phenolic resin, and thus a van der Waals force can act between an aromatic ring of the phenolic resin and the polymer of the rubber component, and a hydrogen bond can occur between a hydroxy group of the phenolic resin and the polymer of the rubber component, and thus relatively strong intermolecular attraction acts between the phenolic resin and the polymer of the rubber component. Consequently, the adhesive strength between the two layers can be improved without using any volatile organic compounds.

A sixth aspect of the present disclosure is any one of the first to fifth aspects, in which at the lamination process, the second layer is laminated on the outer surface of the first layer with the first layer expanded radially outward.

According to this sixth aspect, at the lamination process, the second layer is laminated with the first layer expanded radially outward, and thus the first layer is pressed against the second layer to adhere thereto to improve the adhesive strength between the two layers. Consequently, the adhesive strength between the two layers can be improved without using any volatile organic compounds.

A seventh aspect of the present disclosure is the sixth aspect, in which at the lamination process, vacuuming is performed on the first layer at 0.03 MPa or more and 0.08 MPa or less to make the first layer in an expanded state.

According to this seventh aspect, at the lamination process, a simple method in which vacuuming is performed on the first layer with 0.03 MPa or more and 0.08 MPa or less can improve the adhesiveness between the two layers.

An eighth aspect of the present disclosure is a laminated rubber hose that includes a first layer containing a thermosetting resin and a second layer laminated on an outer surface of the first layer, an adhesive part between the first layer and the second layer containing no volatile organic compounds.

According to this eighth aspect, the first layer contains the thermosetting resin, and thus intermolecular attraction acts between the thermosetting resin of the first layer and the polymer of the rubber component of the second layer. Consequently, a laminated rubber hose with the adhesive strength between the first layer and the second layer maintained without using any volatile organic compounds in the adhesive part between the two layers can be obtained.

A ninth aspect of the present disclosure is the eighth aspect, further including an intermediate layer interposed between the first layer and the second layer, adhesive strength between the first layer and the second layer being 25 N/cm or more.

According to this ninth aspect, a laminated rubber hose further including the intermediate layer interposed between the first layer and the second layer and having an adhesive strength between the two layers of 25 N/cm or more without using any volatile organic compounds can be obtained.

As described in the foregoing, the present disclosure can maintain the adhesive strength between the two layers without using any volatile organic compounds.

DETAILED DESCRIPTION

Embodiments of the present invention will be described in detail below, with reference to the drawings. The following description of the advantageous embodiments is only an example in nature, and is not intended to limit the scope, applications or use of the present invention.

EMBODIMENTS

Configuration of Laminated Rubber Hose

Figure 1:
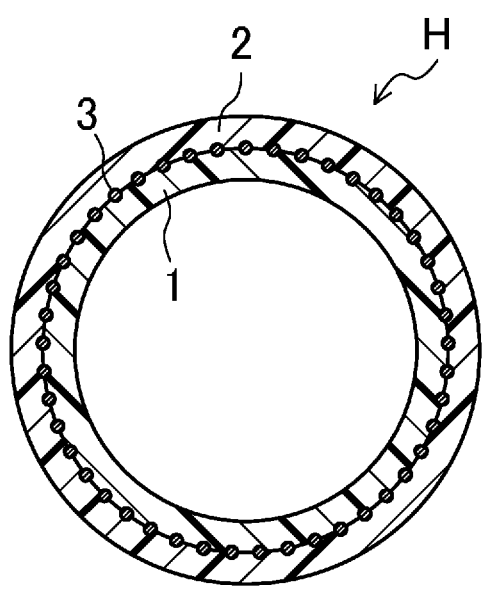
FIG. 1 is a sectional view of a laminated rubber hose according to an embodiment of the present invention.

As illustrated in FIG. 1, this laminated rubber hose H includes a substantially circular tubular first layer 1 as an inner layer and a a substantially circular tubular second layer 2 as an outer layer laminated on an outer surface of this first layer 1. This laminated rubber hose H does not contain any volatile organic compounds in an adhesive part between the first layer 1 and the second layer 2.

The first layer 1 is formed of a first rubber material 1a containing a rubber component and a compounding ingredient. Examples of the rubber component of the first rubber material 1a include a nitrile rubber (NBR) and an ethylene-propylene-diene rubber (EPDM). The compounding ingredient of the first rubber material 1a contains a thermosetting resin. As the thermosetting resin, a phenolic resin is preferred. The content of the thermosetting resin of the first layer 1 is preferably 4.5 parts by mass or less, more preferably 1 part by mass or more and 4 parts by mass or less, and even more preferably 2 parts by mass or more and 4 parts by mass or less relative to 100 parts by mass of the rubber component. Examples of the compounding ingredient of the first rubber material 1a include carbon black, calcium carbonate, softening agents, zinc oxide, stearic acid, antioxidants, processing aids, sulfur, vulcanization accelerators, and plasticizers other than the thermosetting resin. The compounding ingredient of the first rubber material 1a may contain components other than these components.

The first layer 1 has an inner diameter of about 6 mm or more and 36 mm or less and a thickness of about 1 mm or more and 4 mm or less, for example.

On the outer surface of the first layer 1, reinforcing yarn 3 as an intermediate layer is braided. The reinforcing yarn 3 is provided spaced apart in a circumferential direction of the first layer 1 (see FIG. 1). The reinforcing yarn 3 is formed of a polynosic fiber or the like, for example.

The second layer 2 is formed of a second rubber material 2a containing a rubber component and a compounding ingredient. Examples of the rubber component of the second rubber material 2a include a chloroprene rubber (CR) and an ethylene-propylene-diene rubber. The compounding ingredient of the second rubber material 2a contains a thermosetting resin. The thermosetting resin is preferably a phenolic resin. The content of the thermosetting resin of the second layer 2 is preferably 4.5 parts by mass or less, more preferably 1 part by mass or more and 4 parts by mass or less, and even more preferably 2 parts by mass or more and 4 parts by mass or less relative to 100 parts by mass of the rubber component. Examples of the compounding ingredient of the second rubber material 2a include carbon black, calcium carbonate, softening agents, zinc oxide, stearic acid, antioxidants, processing aids, sulfur, vulcanization accelerators, and plasticizers other than the thermosetting resin. The compounding ingredient of the second rubber material 2a may contain components other than these components.

The second layer 2 has a thickness of about 1 mm or more and 4 mm or less, for example. The first layer 1 and the second layer 2 have a total thickness of about 2 mm or more and 5 mm or less, for example.

The second layer 2 adheres to the first layer 1 through gaps of the reinforcing yarn 3 adjacent to each other in the circumferential direction. Adhesive strength between the first layer 1 and the second layer 2 is preferably 25 N/cm or more, more preferably 30 N/cm or more, and even more preferably 40 N/cm or more. No adhesive is applied to the adhesive part between the two layers 1 and 2.

Apparatus for Manufacturing Laminated Rubber Hose

Figure 2:
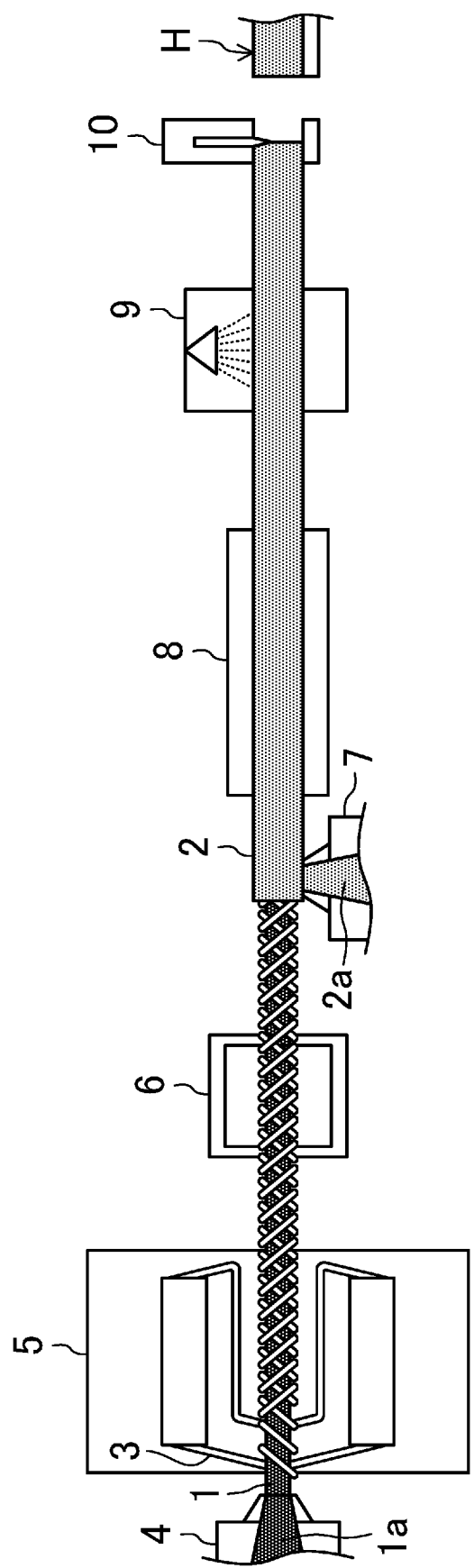
FIG. 2 is a schematic diagram of an apparatus for manufacturing a laminated rubber hose.

FIG. 2 illustrates an apparatus for manufacturing the laminated rubber hose H.

The manufacturing apparatus includes a first extruder 4, a braider 5, a preheater 6, a second extruder 7, a cooling water tank 8, an applicator 9, and a cutter 10. The first extruder 4, the braider 5, the preheater 6, the second extruder 7, the cooling water tank 8, the applicator 9, and the cutter 10 are arranged in this order from an upstream side.

The first extruder 4 extrudes the first rubber material 1*a* for the first layer 1 to form the first layer 1. The braider 5 draws out the reinforcing yarn 3 from a bobbin carrier to braid the reinforcing yarn 3 on the outer surface of the first layer 1 formed by the first extruder 4. The preheater 6 heats the first layer 1 on which the reinforcing yarn 3 has been braided by the braider 5. The second extruder 7 extrudes the second rubber material 2*a* for the second layer 2 to laminate the second layer 2 on the outer surface of the first layer 1 heated by the preheater 6. The cooling water tank 8 cools the two layers 1 and 2 laminated on one another by the second extruder 7. The applicator 9 applies an adhesion preventing agent to an outer surface of the second layer 2 of the two layers 1 and 2 cooled by the cooling water tank 8.

Method for Manufacturing Laminated Rubber Hose

A method for manufacturing the laminated rubber hose H includes a preparation process for the rubber materials 1*a* and 2*a*, a formation process for the first layer 1, a braiding process for the reinforcing yarn 3, a heating process heating the first layer 1, and a lamination process laminating the second layer 2 on the first layer 1.

At the preparation process, the first rubber material 1*a* for the first layer 1 and the second rubber material 2*a* for the second layer 2 are prepared.

After the preparation process, the formation process is performed extruding the first rubber material 1*a* from the first extruder 4 to form the first layer 1. After the formation process, the braiding process is performed drawing out the reinforcing yarn 3 from the bobbin carrier to braid the reinforcing yarn 3 on the outer surface of the first layer 1 by the braider 5.

After the braiding process, the heating process is performed heating the first layer 1 by the preheater 6 to make an outer surface temperature of the first layer 1 within a certain temperature range described below. Specifically, the first layer 1 on which the reinforcing yarn 3 has been braided is fed into the preheater 6 by a belt conveyor (not illustrated). The preheater 6 heats the first layer 1 until its outer surface temperature is within the certain temperature range. The certain temperature range is set to a temperature range in which the thermosetting resin contained in the first layer 1 becomes a branched polymer and the first layer 1 does not become hard owing to excessive progress of cross-linking of the thermosetting resin. Such a temperature range is preferably a range of 65° C. or more and 105° C. or less, more preferably a range of 85° C. or more and 105° C. or less, and even more preferably a range of 95° C. or more and 105° C. or less. At this process, the temperature inside the preheater 6 is set to a range of 150° C. or more and 200° C. or less, for example.

After the heating process, the lamination process is performed extruding the second rubber material 2*a* onto the outer surface of the first layer 1 maintained at the certain temperature range by the second extruder 7 to laminate the second layer 2 thereon. At this process, vacuuming is performed on the first layer 1 to reduce the atmospheric pressure outside the first layer 1 and to make the first layer 1 in a state expanded radially outward. The magnitude of the pressure reduction of vacuuming is preferably within a range of 0.03 MPa or more and 0.08 MPa or less and more preferably within a range of 0.06 MPa or more and 0.08 MPa or less. Thus, a pre-product of the laminated rubber hose is obtained.

After the lamination process, the pre-product is cooled by the cooling water tank 8. Subsequently, the adhesion preventing agent is applied to the outer surface of the second layer 2 by the applicator 9, and then the pre-product is cut into a certain length by the cutter 10. Thus, the laminated rubber hose H is obtained.

Advantages

According to the present embodiment, the first layer 1 contains the thermosetting resin, and thus intermolecular attraction acts between the thermosetting resin of the first layer 1 and the polymer of the rubber component of the second layer 2. At the lamination process, the second layer 2 is laminated on the outer surface of the first layer 1 maintained at 65° C. or more, and thus the thermosetting resin becomes a branched polymer, by which a side chain of the thermosetting resin is made sufficiently close to the polymer of the rubber component to facilitate interaction therewith. That is to say, the thermosetting resin of the first layer 1 takes a molecular structure facilitating the action of the intermolecular attraction with the polymer of the rubber component of the second layer 2. Further, action to soften the first layer 1 by the thermosetting resin is exerted, and the adhesiveness of the first layer 1 to the second layer 2 improves.

By the way, it is considered that the fact that the intermolecular attraction acts between the thermosetting resin of the first layer 1 and the polymer of the rubber component of the second layer 2 and besides the fact that the thermosetting resin is cross-linked with the polymer of the rubber component of the second layer 2 contribute to the adhesive strength between the two layers 1 and 2. However, when the cross-linking between the thermosetting resin and the polymer of the rubber component excessively progresses, the properties of the first layer 1 and the second layer 2 change, and thus the cross-linking is preferably moderately limited in view of maintaining the rubber properties.

According to the present embodiment, the content of the thermosetting resin of the first layer 1 is 4.5 parts by mass or less relative to 100 parts by mass of the rubber component, and the temperature of the outer surface of the first layer 1 at the lamination process is 105° C. or less, and thus the cross-linking by the thermosetting resin can moderately be limited, and significant changes in properties and scorch of the rubber (the first layer) can be reduced. Consequently, owing to the intermolecular attraction between the thermosetting resin of the first layer 1 and the polymer of the rubber component of the second layer 2 and improvement in the adhesiveness between the two layers 1 and 2, the adhesive strength between the two layers 1 and 2 is obtained, and the properties of the two layers 1 and 2 can be maintained. Consequently, the adhesive strength between the two layers 1 and 2 can be maintained while maintaining the properties of the two layers 1 and 2 without using any volatile organic compounds.

According to the present embodiment, the temperature of the outer surface of the first layer 1 can surely be 65° C. or more and 105° C. or less by the heating process performed before the lamination process.

According to the present embodiment, not only the first layer 1 but also the second layer 2 contains the thermosetting resin, and thus intermolecular attraction acts between the polymer of the rubber component of the first layer 1 and the thermosetting resin of the second layer 2. Further, action to soften the second layer 2 by the thermosetting resin is exerted, and the adhesiveness of the second layer 2 to the first layer 1 improves. Consequently, the adhesive strength between the two layers 1 and 2 improves compared with a case in which only the first layer 1 contains the thermosetting resin. Consequently, the adhesive strength between the two layers 1 and 2 can be improved without using any volatile organic compounds.

According to the present embodiment, the conte of the thermosetting resin in the second rubber material 2*a* is 4.5 parts by mass or less relative to 100 parts by mass of the rubber component of the second rubber material 2*a*, and thus cross-linking by the thermosetting resin can moderately be limited, and significant changes in properties and scorch of the rubber (the second layer 2) can be reduced. Consequently, the rubber properties of the two layers 1 and 2 can be maintained while improving the adhesive strength between the two layers 1 and 2 without using any volatile organic compounds.

According to the present embodiment, the thermosetting resin contained in the first layer 1 is a phenolic resin, and thus a van der Waals force can act between an aromatic ring of the phenolic resin and the polymer of the rubber component, and a hydrogen bond can occur between a hydroxy group of the phenolic resin and the polymer of the rubber component, and thus relatively strong intermolecular attraction acts between the phenolic resin and the polymer of the rubber component. Consequently, the adhesive strength between the two layers 1 and 2 can be improved without using any volatile organic compounds.

According to this embodiment, at the lamination process, the second layer 2 is laminated with the first layer 1 expanded radially outward, and thus the first layer 1 is pressed against the second layer 2 to adhere thereto to improve the adhesive strength between the two layers 1 and 2. Consequently, the adhesive strength between the two layers 1 and 2 can be improved without using any volatile organic compounds.

According to the present embodiment, at the lamination process, a simple method in which vacuuming is performed on the first layer 1 with 0.03 MPa or more and 0.08 MPa or less can improve the adhesive strength between the two layers 1 and 2.

According to the present embodiment, the first layer 1 contains the thermosetting resin, and thus intermolecular attraction acts between the thermosetting resin of the first layer 1 and the polymer of the rubber component of the second layer 2. Consequently, a laminated rubber hose with the adhesive strength between the first layer 1 and the second layer 2 maintained without using any volatile organic compounds in the adhesive part between the two layers 1 and 2 can be obtained.

According to the present embodiment, the laminated rubber hose H further including the reinforcing yarn 3 (the intermediate layer) interposed between the first layer 1 and the second layer 2 and having an adhesive strength between the two layers 1 and 2 of 25 N/cm or more without using any volatile organic compounds can be obtained.

OTHER EMBODIMENTS

Although the laminated rubber hose H has a three-layer structure of the first layer 1, the reinforcing yarn 3, and the second layer 2 in the embodiment, this is not limiting so long as the first layer 1 and the second layer 2 are included. The laminated rubber hose H may have a two-layer structure including only the first layer 1 and the second layer 2 without the reinforcing yarn 3 or a structure with four or more layers including the first layer 1 and the second layer 2, for example.

Although the rubber component of the first rubber material 1*a* is a nitrile rubber or an ethylene-propylene-diene rubber, whereas the rubber component of the second rubber material 2*a* is a chloroprene rubber or an ethylene-propylene-diene rubber in the embodiment, this is not limiting. The rubber component may be a chlorosulfonated polyethylene, an acrylic rubber, an epichlorohydrin rubber, a hydrogenated nitrile rubber, a fluorine rubber, or the like, for example.

Although the thermosetting resin of the first rubber material 1*a* and the second rubber material 2*a* is a phenolic resin in the embodiment, this is not limiting. The thermosetting resin may be a melamine resin, a coumarone-indene resin, a rosin-rosin ester resin, a hydrocarbon resin, or the like, for example; these may be used in combination.

In the embodiment, the compounding ingredient of the second rubber material 2*a* does not necessarily contain the thermosetting resin.

Although the heating process is performed in the embodiment, so long as the outer surface temperature of the first layer 1 can be maintained at a temperature range of 65° C. or more and 105° C. or less at the lamination process, the heating process is not necessarily performed.

Although no adhesive is applied to the adhesive part between the two layers 1 and 2 in the embodiment, an adhesive containing no volatile organic compounds may be applied thereto.

Although the first layer 1 is made to be in the expanded state by vacuuming at the lamination process in the embodiment, this is no limiting. A cylindrical rod member having an outer diameter larger than the inner diameter of the first layer 1 may be inserted into the first layer 1 to make the first layer 1 in the expanded state, for example.

EXAMPLES

The following describes examples specifically performed.

Example 1

At the preparation process, Rubber Material A was prepared, and Rubber Material A was used as the first rubber material and the second rubber material. As listed in Table 1, Rubber Material A contains 60 parts by mass of ethylene-propylene-diene rubber-1 (manufactured by Sumitomo Chemical Co., Ltd., trade name: Esprene (registered trademark) 553) and 40 parts by mass of ethylene-propylene-diene rubber-2 (manufactured by Mitsui Chemicals, Inc., trade name: EPT3092M) as the rubber component and 1.5 parts by mass of a phenolic resin (manufactured by Akrochem Corp., trade name: Elaztobond (registered trademark) A250) and 2.25 parts by mass of a melamine resin (manufactured by Allnex, trade name: CYREZ (registered trademark) 964) as the compounding ingredient. As the compounding ingredient other than the thermosetting resin (the phenolic resin and the melamine resin), Rubber Material A contains 130 parts by mass of carbon black-1 (manufactured by Tokai Carbon Co., Ltd., Seast (registered trademark) SO), 70 parts by mass of calcium carbonate-1 (manufactured by Toyo Fine Chemical Kaisha, Ltd., trade name: Whiton P-30), 75 parts by mass of a softening agent (manufactured by Idemitsu Kosan Co., Ltd., trade name: Diana Process Oil PS-430), 5 parts by mass of zinc oxide (manufactured by Seido Chemical Industry Co., Ltd., trade name: Zinc Oxide Type 2), 1 part by mass of stearic acid-1 (manufactured by NOF Corporation, trade name: Beads Stearic Acid), 1 part by mass of antioxidant-1 (manufactured by Seiko Chemical Co., Ltd., trade name: Nonflex (registered trademark) RD), 2 parts by mass of antioxidant-2 (manufactured by Ouchi Shinko Chemical Industrial Co., Ltd., trade name: Noclac (registered trademark) MB), 2 parts by mass of a processing aid (manufactured by DOG Chemie, trade name: Deoflow A), 0.5 part by mass of sulfur (manufactured by Tsurumi Chemical Industry Co., Ltd., trade name: Sulfax (registered trademark) A), 1 part by mass of vulcanization accelerator-1 (manufactured by Sanshin Chemical Industry Co., Ltd., trade name: Sanceler (registered trademark) CM-G), 1 part by mass of vulcanization accelerator-2 (manufactured by Sanshin Chemical Industry Co., Ltd., trade name: Sanceler (registered trademark) TT-G), 1 part by mass of vulcanization accelerator-3 manufactured by Sanshin Chemical Industry Co., Ltd., trade name: Sanceler (registered trademark) TRA), and 0.5 part by mass of vulcanization accelerator-4 (manufactured by Sanshin Chemical Industry Co., Ltd., trade name: Sanceler (registered trademark) BZ).

TABLE 1

| Component | Rubber Material | | | | | |
|---|---|---|---|---|---|---|
| | A | B | C | D | E | F |
| EPDM-1 | 60 | 60 | 60 | 60 | 60 | 60 |
| EPDM-2 | 40 | 40 | 40 | 40 | 40 | 40 |
| Carbon Black-1 | 130 | 130 | 130 | 130 | 130 | 130 |
| Calcium Carbonate-1 | 70 | 70 | 70 | 70 | 70 | 70 |
| Softening Agent | 75 | 75 | 75 | 75 | 75 | 75 |
| Zinc Oxide | 5 | 5 | 5 | 5 | 5 | 5 |
| Stearic Acid-1 | 1 | 1 | 1 | 1 | 1 | 1 |
| Anioxidant-1 | 1 | 1 | 1 | 1 | 1 | 1 |
| Anioxidant-2 | 2 | 2 | 2 | 2 | 2 | 2 |
| Processing Aid | 2 | 2 | 2 | 2 | 2 | 2 |
| Phenolic Resin | 1.5 | 1 | 0.5 | 0.25 | 0 | 2 |
| Melamine Resin | 2.25 | 1.5 | 0.75 | 0.38 | 0 | 3 |
| Sulfur | 0.5 | 0.5 | 0.5 | 0.5 | 0.5 | 0.5 |
| Vulcanization Accelerator-1 | 1 | 1 | 1 | 1 | 1 | 1 |
| Vulcanization Accelerator-2 | 1 | 1 | 1 | 1 | 1 | 1 |
| Vulcanization Accelerator-3 | 1 | 1 | 1 | 1 | 1 | 1 |
| Vulcanization Accelerator-4 | 0.5 | 0.5 | 0.5 | 0.5 | 0.5 | 0.5 |

At the formation process after the preparation process, the first layer was formed from the first rubber material. At the braiding process after the formation process, reinforcing yarn formed of a polynosic fiber was braided on the outer surface of the first layer. At the heating process after the braiding process, the temperature inside the preheater was set to 200° C. so that the outer surface temperature of the first layer was 100° C. At the lamination process after the heating process, the outer surface temperature of the first layer was maintained at 100° C. The magnitude of the pressure reduction of vacuuming was set to 0.07 MPa (see Table 2). A manufactured laminated rubber hose had an inner diameter of 16 mm, an outer diameter of 24 mm, a thickness of the first layer of 2.0 mm, and a thickness of the second layer of 2.0 mm.

TABLE 2

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Example 1 | A | A | 100 | 0.07 | 44 | Passed |
| Example 2 | A | A | 100 | 0.05 | 41 | Passed |
| Example 3 | A | A | 100 | 0.02 | 34 | Passed |
| Example 4 | A | A | 100 | 0.01 | 33 | Passed |
| Example 5 | A | A | 100 | 0.00 | 30 | Passed |
| Example 6 | A | A | 90 | 0.07 | 43 | Passed |
| Example 7 | A | A | 90 | 0.05 | 41 | Passed |
| Example 8 | A | A | 90 | 0.02 | 34 | Passed |
| Example 9 | A | A | 90 | 0.01 | 32 | Passed |
| Example 10 | A | A | 90 | 0.00 | 29 | Passed |
| Example 11 | A | A | 70 | 0.07 | 34 | Passed |
| Example 12 | A | A | 70 | 0.05 | 31 | Passed |
| Example 13 | A | A | 70 | 0.02 | 27 | Passed |
| Example 14 | A | A | 70 | 0.01 | 24 | Passed |
| Example 15 | A | A | 70 | 0.00 | 22 | Passed |

Examples 2 to 15

These examples were performed in a manner similar to Example 1 except that the following experimental conditions were changed (see Table 2). Specifically, in Examples 2 to 4, the magnitude of the pressure reduction of vacuuming was set to 0.05 MPa (Example 2), 0.02 MPa (Example 3), and 0.01 MPa (Example 4). In Example 5, vacuuming was not performed.

In Examples 6 to 10, the temperature inside the preheater was set to 150° C. so that the outer surface temperature of the first layer was 90° C., and at the lamination process, the outer surface temperature of the first layer was maintained at 90° C. The magnitude of the pressure reduction of vacuuming was set to 0.05 MPa (Example 7), 0.02 MPa (Example 8), and 0.01 MPa (Example 9). In Example 10, vacuuming was not performed.

In Examples 11 to 15, the heating process was not performed, and at the lamination process, the outer surface temperature of the first layer was maintained at 70° C., which is a little lower than the outer surface temperature of the first layer at the formation process. The magnitude of the pressure reduction of vacuuming was set to 0.05 MPa (Example 12), 0.02 MPa (Example 13), and 0.01 MPa (Example 14). In Example 15, vacuuming was not performed.

Examples 16 to 30

These examples were performed in a manner similar to Example 1 except that at the preparation process, Rubber Material B shown below was prepared, and the following processes were performed with this Rubber Material B used as the first rubber material and the second rubber material, and the experimental conditions were changed as described below (see Table 3).

TABLE 3

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Example 16 | B | B | 100 | 0.07 | 43 | Passed |
| Example 17 | B | B | 100 | 0.05 | 40 | Passed |
| Example 18 | B | B | 100 | 0.02 | 33 | Passed |
| Example 19 | B | B | 100 | 0.01 | 31 | Passed |
| Example 20 | B | B | 100 | 0.00 | 28 | Passed |
| Example 21 | B | B | 90 | 0.07 | 42 | Passed |
| Example 22 | B | B | 90 | 0.05 | 39 | Passed |
| Example 23 | B | B | 90 | 0.02 | 32 | Passed |
| Example 24 | B | B | 90 | 0.01 | 30 | Passed |
| Example 25 | B | B | 90 | 0.00 | 27 | Passed |
| Example 26 | B | B | 70 | 0.07 | 32 | Passed |
| Example 27 | B | B | 70 | 0.05 | 30 | Passed |
| Example 28 | B | B | 70 | 0.02 | 25 | Passed |
| Example 29 | B | B | 70 | 0.01 | 23 | Passed |
| Example 30 | B | B | 70 | 0.00 | 20 | Passed |

As listed in Table 1, Rubber Material B is similar to Rubber Material A except that the content of the phenolic resin relative to 100 parts by mass of the ethylene-propylene-diene rubber is 1 part by mass and the content of the melamine resin relative thereto is 1.5 parts by mass.

In Examples 17 to 19, the magnitude of the pressure reduction of vacuuming was set to 0.05 MPa (Example 17), 0.02 MPa (Example 18), and 0.01 MPa (Example 19). In Example 20, vacuuming was not performed.

In Examples 21 to 25, at the lamination process, the temperature of the outer surface of the first layer was maintained at 90° C. The magnitude of the pressure reduction of vacuuming was set to 0.05 MPa (Example 22), 0.02 MPa (Example 23), and 0.01 MPa (Example 24). In Example 25, vacuuming was not performed.

In Examples 26 to 30, at the lamination process, the temperature of the outer surface of the first layer was maintained at 70° C. The magnitude of the pressure reduction of vacuuming was set to 0.05 MPa (Example 27), 0.02 MPa (Example 28), and 0.01 MPa (Example 29). In Example 30, vacuuming was not performed.

Examples 31 to 45

These examples were performed in a manner similar to Example 1 except that at the preparation process, Rubber Material C shown below was prepared, and the following processes were performed with this Rubber Material C used as the first rubber material and the second rubber material, and the experimental conditions described below were changed (see Table 4).

TABLE 4

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Example 31 | C | C | 100 | 0.07 | 40 | Passed |
| Example 32 | C | C | 100 | 0.05 | 37 | Passed |
| Example 33 | C | C | 100 | 0.02 | 30 | Passed |
| Example 34 | C | C | 100 | 0.01 | 28 | Passed |
| Example 35 | C | C | 100 | 0.00 | 25 | Passed |
| Example 36 | C | C | 90 | 0.07 | 38 | Passed |
| Example 37 | C | C | 90 | 0.05 | 35 | Passed |
| Example 38 | C | C | 90 | 0.02 | 28 | Passed |
| Example 39 | C | C | 90 | 0.01 | 26 | Passed |
| Example 40 | C | C | 90 | 0.00 | 23 | Passed |
| Example 41 | C | C | 70 | 0.07 | 23 | Passed |
| Example 42 | C | C | 70 | 0.05 | 20 | Passed |
| Example 43 | C | C | 70 | 0.02 | 18 | Passed |
| Example 44 | C | C | 70 | 0.01 | 15 | Passed |
| Example 45 | C | C | 70 | 0.00 | 14 | Passed |

As listed in Table 1, Rubber Material C is similar to Rubber Material A except that the content of the phenolic resin relative to 100 parts by mass of the ethylene-propylene-diene rubber is 0.5 part by mass and the content of the melamine resin relative thereto is 0.75 part by mass.

In Examples 32 to 34, the magnitude of the pressure reduction of vacuuming was set to 0.05 MPa (Example 32), 0.02 MPa (Example 33), and 0.01 MPa (Example 34). In Example 35, vacuuming was not performed.

In Examples 36 to 40, at the lamination process, the temperature of the outer surface of the first layer was maintained at 90° C. The magnitude of vacuuming was set to 0.05 MPa (Example 37), 0.02 MPa (Example 38), and 0.01 MPa (Example 39). In Example 40, vacuuming was not performed.

In Examples 41 to 45, at the lamination process, the temperature of the outer surface of the first layer was maintained at 70° C. The magnitude of the pressure reduction of vacuuming was set to 0.05 MPa (Example 42), 0.02 MPa (Example 43), and 0.01 MPa (Example 44). In Example 45, vacuuming was not performed.

Examples 46 to 60

Examples 46 to 60 were performed in a manner similar to Example 1 except that at the preparation process, Rubber Material D shown below was prepared, and the following processes were performed with this Rubber Material D used as the first rubber material and the second rubber material, and the experimental conditions described below were changed (see Table 5).

TABLE 5

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Example 46 | D | D | 100 | 0.07 | 35 | Passed |
| Example 47 | D | D | 100 | 0.05 | 31 | Passed |
| Example 48 | D | D | 100 | 0.02 | 23 | Passed |
| Example 49 | D | D | 100 | 0.01 | 15 | Passed |
| Example 50 | D | D | 100 | 0.00 | 10 | Passed |
| Example 51 | D | D | 90 | 0.07 | 29 | Passed |
| Example 52 | D | D | 90 | 0.05 | 27 | Passed |
| Example 53 | D | D | 90 | 0.02 | 22 | Passed |
| Example 54 | D | D | 90 | 0.01 | 15 | Passed |
| Example 55 | D | D | 90 | 0.00 | 10 | Passed |
| Example 56 | D | D | 70 | 0.07 | 20 | Passed |
| Example 57 | D | D | 70 | 0.05 | 18 | Passed |
| Example 58 | D | D | 70 | 0.02 | 10 | Passed |
| Example 59 | D | D | 70 | 0.01 | 0 | Passed |
| Example 60 | D | D | 70 | 0.00 | 0 | Passed |

As listed in Table 1, Rubber Material D is similar to Rubber Material A except that the content of the phenolic resin relative to 100 parts by mass of the ethylene-propylene-diene rubber is 0.25 part by mass and the content of the melamine resin relative thereto is 0.38 part by mass.

In Examples 47 to 49, the magnitude of the pressure reduction of vacuuming was set to 0.05 MPa (Example 47), 0.02 MPa (Example 48), and 0.01 MPa (Example 49). In Example 50, vacuuming was not performed.

In Examples 51 to 55, at the lamination process, the temperature of the outer surface of the first layer was maintained at 90° C. The magnitude of the pressure reduction of vacuuming was set to 0.05 MPa (Example 52), 0.02 MPa (Example 53), and 0.01 MPa (Example 54). In Example 55, vacuuming was not performed.

In Examples 56 to 60, at the lamination process, the temperature of the outer surface of the first layer was maintained at 70° C. The magnitude of the pressure reduction of vacuuming was set to 0.05 MPa (Example 57), 0.02 MPa (Example 58), and 0.01 MPa (Example 59). In Example 60, vacuuming was not performed.

Example 61

This example was performed in a manner similar to Example 1 except that at the preparation process, Rubber Material G and Rubber Material H shown below were prepared, and the following processes were performed with Rubber Material G used as the first rubber material and with Rubber Material H used as the second rubber material, and the experimental conditions described below were changed (see Table 6).

TABLE 6

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Example 61 | G | H | 90 | 0.03 | 25 | Passed |
| Comparative Example 26 | I | J | 90 | 0.03 | 10 | Passed |
| Comparative Example 27 | I | J | 70 | 0.00 | 5 | Passed |

As listed in Table 7, Rubber Material G contains 100 parts by mass of a nitrile rubber (manufactured by JSR Corporation, trade name: NV240) as the rubber component and 1 part by mass of a phenolic resin (manufactured by Akrochem Corp., trade name: Elaztobond (registered trademark) A250) and 1.5 parts by mass of a melamine resin (manufactured by Allnex, trade name: CYREZ (registered trademark) 964) as the compounding ingredient. In addition, as the compounding ingredient other than the thermosetting resin (the phenolic resin and the melamine resin), Rubber Material G contains 70 parts by mass of carbon black-1 (manufactured by Tokai Carbon Co., Ltd., Seast (registered trademark) SO), 15 parts by mass of plasticizer-1 (manufactured by DIC Corporation, trade name: Monocizer (registered trademark) W-260), 15 parts by mass of plasticier-2 (manufactured by Mitsubishi Chemical Corporation, trade name: DINP), 30 parts by mass calcium carbonate-2 (manufactured by Konoshima Chemical Co., Ltd., trade name: Calcium Carbonate Light), 5 parts by mass of zinc oxide (manufactured by Seido Chemical Industry Co., Ltd., trade name: Zinc Oxide Type 2), 0.5 part by mass of stearic acid-2 (manufactured by Kao Corporation, trade name: Lunac (registered trademark) S30), 1 part by mass of antioxidant-3 (manufactured by Ouchi Shinko Chemical Industrial Co., Ltd., trade name: Noclac (registered trademark) 224), 0.5 part by mass of antioxidant-4 (manufactured by Kawaguchi Chemical Industry Co., Ltd., trade name: Antage (registered trademark) 3C), 0.5 part by mass of sulfur (manufactured by Tsurumi Chemical Industry Co., Ltd., trade name: Sulfax (registered trademark) 200S), 0.1 part by mass of vulcanization accelerator-1 (manufactured by Sanshin Chemical Industry Co., Ltd., trade name: Sanceler (registered trademark) CM-G), and 1 part by mass of vulcanization accelerator-5 (manufactured by Sanshin Chemical Industry Co., Ltd., trade name: Sanceler (registered trademark) NOB).

TABLE 7

| Component | Rubber Material G | Rubber Material H | Rubber Material I | Rubber Material J |
|---|---|---|---|---|
| Nitrile Rubber | 100 | 0 | 100 | 0 |
| Chloroprene Rubber-1 | 0 | 60 | 0 | 60 |
| Chloroprene Rubber-2 | 0 | 40 | 0 | 40 |
| Carbon Black-1 | 70 | 0 | 70 | 0 |
| Carbon black-2 | 0 | 80 | 0 | 80 |
| Plasticizer-1 | 15 | 0 | 15 | 0 |
| Plasticizer-2 | 15 | 0 | 15 | 0 |
| Plasticizer-3 | 0 | 20 | 0 | 20 |
| Calcium Carbonate-2 | 30 | 0 | 30 | 0 |
| Filler | 0 | 40 | 0 | 40 |
| Magnesium Oxide | 0 | 4 | 0 | 4 |
| Zinc Oxide | 5 | 4 | 5 | 4 |
| Stearic Acid-2 | 0.5 | 1 | 0.5 | 1 |
| Paraffin Wax | 0 | 1.5 | 0 | 1.5 |
| Anioxidant-2 | 0 | 0.5 | 0 | 0.5 |
| Anioxidant-3 | 1 | 0.5 | 1 | 0.5 |
| Anioxidant-4 | 0.5 | 1 | 0.5 | 1 |
| Anioxidant-5 | 0 | 1 | 0 | 1 |
| Anioxidant-6 | 0 | 0.5 | 0 | 0.5 |
| Phenolic Resin | 1 | 1 | 0 | 0 |
| Melamine Resin | 1.5 | 1.5 | 0 | 0 |
| Sulfur | 0.5 | 0 | 0.5 | 0 |
| Vulcanization Accelerator-1 | 0.1 | 0 | 0.1 | 0 |
| Vulcanization Accelerator-5 | 1 | 0 | 1 | 0 |
| Vulcanization Accelerator-6 | 0 | 0.5 | 0 | 0.5 |
| Vulcanization Accelerator-7 | 0 | 1.5 | 0 | 1.5 |

As listed in Table 7, Rubber Material H contains 60 parts by mass of chloroprene rubber-1 (manufactured by Denka Co., Ltd, trade name: Chloroprene M-41) and 40 parts by mass of chloroprene rubber-2 (manufactured by Denka Co., Ltd, trade name: Chloroprene EM-40) as the rubber component and 1 part by mass of a phenolic resin (manufactured by Akrochem Corp., trade name: Elaztobond (registered trademark) A250) and 1.5 parts by mass of a melamine resin (manufactured by Allnex, trade name: CYREZ (registered trademark) 964) as the compounding ingredient. In addition, as the compounding ingredient other than the thermosetting resin (the phenolic resin and the melamine resin), Rubber Material H contains 80 parts by mass of carbon black-2 (manufactured by Tokai Carbon Co., Ltd., Seast (registered trademark) S), 20 parts by mass of plasticizer-3 (rapeseed oil), 40 parts by mass of a filler (manufactured by Shiraishi Calcium Kaisha, Ltd., trade name: Hard Clay), 4 parts by mass of magnesium oxide (manufactured by Konoshima Chemical Co., Ltd., trade name: Starmag), 4 parts by mass of zinc oxide (manufactured by Seido Chemical Industry Co., Ltd., trade name: Zinc Oxide Type 2), 1 part by mass of stearic acid-2 (manufactured by Kao Corporation, trade name: Lunac (registered trademark) S30), 1.5 parts by mass of a paraffin wax (manufactured by Nippon Seiro Co., Ltd., trade name: Paraffin Wax), 0.5 part by mass of antioxidant-2 (manufactured by Ouchi Shinko Chemical Industrial Co., Ltd., trade name: Noclac (registered trademark) MB), 0.5 part by mass of antioxidant-3 (manufactured by Ouchi Shinko Chemical Industrial Co., Ltd., trade name: Noclac (registered trademark) 224), 1 part by mass of antioxidant-4 (manufactured by Kawaguchi Chemical Industry Co., Ltd., trade name: Antage (registered trademark) 3C), 1 part by mass of antioxidant-5 (manufactured by Kawaguchi Chemical Industry Co., Ltd., trade name: Antage (registered trademark) OD-P), 0.5 part by mass of antioxidant-6 (manufactured by Ouchi Shinko Chemical Industrial Co., Ltd., trade name: Noclac (registered trademark) PA), 0.5 part by mass of vulcanization accelerator-6 (manufactured by Sanshin Chemical Industry Co., Ltd., trade name: Sanceler (registered trademark) 22-C), and 1.5 parts by mass of vulcanization accelerator-7 (manufactured by Sanshin Chemical Industry Co., Ltd., trade name: Sanceler (registered trademark) DM-P).

In Example 61, at the lamination process, the temperature of the outer surface of the first layer was maintained at 90° C., whereas the magnitude of the pressure reduction of vacuuming was set to 0.03 MPa.

Comparative Examples 1 to 10

These comparative examples were performed in a manner similar to Example 1 except that at the preparation process, Rubber Material E shown below was prepared, and the following processes were performed with this Rubber Material E used as the first rubber material and the second rubber material, and the experimental conditions described below were changed (see Table 8).

TABLE 8

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Comparative Example 1 | E | E | 100 | 0.07 | 34 | Passed |
| Comparative Example 2 | E | E | 100 | 0.05 | 30 | Passed |
| Comparative Example 3 | E | E | 100 | 0.02 | 22 | Passed |
| Comparative Example 4 | E | E | 100 | 0.01 | 15 | Passed |
| Comparative Example 5 | E | E | 100 | 0.00 | 10 | Passed |
| Comparative Example 6 | E | E | 70 | 0.07 | 20 | Passed |
| Comparative Example 7 | E | E | 70 | 0.05 | 18 | Passed |
| Comparative Example 8 | E | E | 70 | 0.02 | 10 | Passed |
| Comparative Example 9 | E | E | 70 | 0.01 | 0 | Passed |
| Comparative Example 10 | E | E | 70 | 0.00 | 0 | Passed |

Rubber Material E is similar to Rubber Material A except that the phenolic resin and the melamine resin are not contained as listed in Table 1.

In Comparative Examples 2 to 4, the magnitude of the pressure reduction of vacuuming was set to 0.05 MPa (Comparative Example 2), 0.02 MPa (Comparative Example 3), and 0.01 MPa (Comparative Example 4). In Comparative Example 5, vacuuming was not performed.

In Comparative Examples 6 to 10, at the lamination process, the temperature of the outer surface of the first layer was maintained at 70° C. The magnitude of the pressure reduction of vacuuming was set to 0.05 MPa (Comparative Example 7), 0.02 MPa (Comparative Example 8), and 0.01 MPa (Comparative Example 9). In Comparative Example 10, vacuuming was not performed.

Comparative Examples 11 to 25

These examples were performed in a manner similar to Example 1 except that at the preparation process, Rubber Material F shown below was prepared, and the following processes were performed with this Rubber Material F used as the first rubber material and the second rubber material, and the experimental conditions described below were changed (see Table 9).

TABLE 9

| | Rubber Material | | Outer Surface Temperature of Inner Layer (° C.) | Pressure Reduction by Vacuuming (MPa) | Adhesive Strength (N/cm) | Rubber Properties |
|---|---|---|---|---|---|---|
| | First Layer | Second Layer | | | | |
| Comparative Example 11 | F | F | 100 | 0.07 | — | Not passed |
| Comparative Example 12 | F | F | 100 | 0.05 | — | Not passed |
| Comparative Example 13 | F | F | 100 | 0.02 | — | Not passed |
| Comparative Example 14 | F | F | 100 | 0.01 | — | Not passed |
| Comparative Example 15 | F | F | 100 | 0.00 | — | Not passed |
| Comparative Example 16 | F | F | 90 | 0.07 | — | Not passed |
| Comparative Example 17 | F | F | 90 | 0.05 | — | Not passed |
| Comparative Example 18 | F | F | 90 | 0.02 | — | Not passed |
| Comparative Example 19 | F | F | 90 | 0.01 | — | Not passed |
| Comparative Example 20 | F | F | 90 | 0.00 | — | Not passed |
| Comparative Example 21 | F | F | 70 | 0.07 | — | Not passed |
| Comparative Example 22 | F | F | 70 | 0.05 | — | Not passed |
| Comparative Example 23 | F | F | 70 | 0.02 | — | Not passed |
| Comparative Example 24 | F | F | 70 | 0.01 | — | Not passed |
| Comparative Example 25 | F | F | 70 | 0.00 | — | Not passed |

Rubber Material F is similar to Rubber Material A except that the content of the phenolic resin relative to 100 parts by mass of the ethylene-propylene-diene rubber is 2 parts by mass and the content of the melamine resin relative thereto is 3 parts by mass as listed in Table 1.

In Comparative Examples 12 to 14, the magnitude of the pressure reduction of vacuuming was set to 0.05 MPa (Comparative Example 12), 0.02 MPa (Comparative Example 13), and 0.01 MPa (Example 14). In Comparative Example 15, vacuuming was not performed.

In Comparative Examples 16 to 20, at the lamination process, the temperature of the outer surface of the first layer was maintained at 90° C. The magnitude of the pressure reduction of vacuuming was set to 0.05 MPa (Comparative Example 17), 0.02 MPa (Comparative Example 18), and 0.01 MPa (Comparative Example 19). In Comparative Example 20, vacuuming was not performed.

In Comparative Examples 21 to 25, at the lamination process, the temperature of the outer surface of the first layer was maintained at 70° C. The magnitude of the pressure reduction of vacuuming was set to 0.05 MPa Comparative (Example 22), 0.02 MPa (Comparative Example 23), and 0.01 MPa (Comparative Example 24). In Comparative Example 25, vacuuming was not performed.

Comparative Examples 26 and 27

These comparative examples were performed in a manner similar to Example 1 except that at the preparation process, Rubber Material I and Rubber Material J shown below were prepared, and the following processes were performed with Rubber Material I used as the first rubber material and with Rubber Material J used as the second rubber material, and the experimental conditions described below were changed (see Table 6).

As listed in Table 7, Rubber Material I is similar to Rubber Material G except that the phenolic resin and the melamine resin are not contained. As listed in Table 7, Rubber Material J is similar to Rubber Material H except that the phenolic resin and the melamine resin are not contained.

In Comparative Example 26, at the lamination process, the temperature of the outer surface of the first layer was maintained at 90° C., whereas the magnitude of the pressure reduction of vacuuming was set to 0.03 MPa.

In Comparative Example 27, at the lamination process, the temperature of the outer surface of the first layer was maintained at 70° C., and vacuuming was not performed.

Evaluation Test

Adhesive Strength

For the laminated rubber hoses according to the examples and the comparative examples, adhesive strength was measured as follows.

The laminated rubber hoses were cut into a length of 25 mm to prepare a test piece. A slit was cut into the second layer along a longitudinal direction of the test piece, and the second layer was peeled off at this slit and was attached to a grip of a tensile tester (manufactured by Toyo Seiki Seisaku-sho, Ltd., trade name: Strograph). The second layer was pulled toward the radial outside of the laminated rubber hose (with an angle of 90 degrees relative to a circumferential surface of the laminated rubber hose) by the tensile tester, and stress at each peeled length was measured until the entire second layer was completely peeled off from the first layer. The tensile rate was set to 25 mm/minute, whereas the temperature during measurement was 23° C. An average of the measured stress was divided by the length of the test piece (25 mm) to calculate adhesive strength.

Evaluation of Rubber Properties

The properties of the laminated rubber hose were evaluated based on a compression permanent strain test (pursuant to JIS K6262) and a liquid resistance test (pursuant to JIS K6258).

In the compression permanent strain test, a circular test piece (diameter: 29.0±0.5 mm, thickness: 12.5±0.5 mm) was compressed by a compression apparatus. In compression, a compression rate was set to 25% using a spacer. In this state, the test piece was left to stand at 150° C. for 70 hours. Subsequently, the test piece was left to stand at room temperature (23° C.) for 30 minutes, and the thickness of the test piece was measured. When a compression permanent strain CS calculated by Expression (1) below is 70% or less, the test piece was determined to be passed.

$$CS=(h0-h1)/(h0-hs)100 \qquad (1)$$

In Expression (1), h0 is the original thickness of the test piece, h1 is the thickness of the test piece after being left to stand for 30 minutes after compression, and hs is the thickness of the spacer.

In the liquid resistance test, a test piece with a thickness of 2 mm and a volume of 2 cm$^3$ was prepared pursuant to JIS K6258. All faces of this test piece were immersed in a highly swelling oil (IRM903) at 100° C. for 70 hours. Subsequently, the volume of the test piece was measured. When the volume of the test piece was 130% or less of that before immersion, the test piece was determined to be passed.

When both the results of the compression permanent strain test and the liquid resistance test were passed, the properties were evaluated to be passed, whereas at least one of them was not passed, the properties were evaluated not to be passed.

Results

Table 2 lists results of Examples 1 to 15, in which the first layer and the second layer are formed of Rubber Material A containing 1.5 parts by mass of the phenolic resin and containing 2.25 parts by mass of the melamine resin.

As listed in Table 2, the adhesive strength was 44 N/cm for Example 1, 41 N/cm for Example 2, 34 N/cm for Example 3, 33 N/cm for Example 4, 30 N/cm for Example 5, 43 N/cm for Example 6, 41 N/cm for Example 7, 34 N/cm for Example 8, 32 N/cm for Example 9, 29 N/cm for Example 10, 34 N/cm for Example 11, 31 N/cm for Example 12, 27 N/cm for Example 13, 24 N/cm for Example 14, and 22 N/cm for Example 15. The rubber properties were passed for all Examples 1 to 15.

Next, Table 3 lists results of Examples 16 to 30, in which the first layer and the second layer are formed of Rubber Material B containing 1 part by mass of the phenolic resin and containing 1.5 parts by mass of the melamine resin.

As listed in Table 3, the adhesive strength was 43 N/cm for Example 16, 40 N/cm for Example 17, 33 N/cm for Example 18, 31 N/cm for Example 19, 28 N/cm for Example 20, 42 N/cm for Example 21, 39 N/cm for Example 22, 32 N/cm for Example 23, 30 N/cm for Example 24, 27 N/cm for Example 25, 32 N/cm for Example 26, 30 N/cm for Example 27, 25 N/cm for Example 28, 23 N/cm for Example 29, and 20 N/cm for Example 30. The rubber properties were passed for all Examples 16 to 30.

Next, Table 4 lists results of Examples 31 to 45, in which the first layer and the second layer are formed of Rubber Material C containing 0.5 part by mass of the phenolic resin and containing 0.75 part by mass of the melamine resin.

As listed in Table 4, the adhesive strength was 40 N/cm for Example 31, 37 N/cm for Example 32, 30 N/cm for Example 33, 28 N/cm for Example 34, 25 N/cm for Example 35, 38 N/cm for Example 36, 35 N/cm for Example 37, 28 N/cm for Example 38, 26 N/cm for Example 39, 23 N/cm for Example 40, 23 N/cm for Example 41, 20 N/cm for Example 42, 18 N/cm for Example 43, 15 N/cm for Example 44, and 14 N/cm for Example 45. The rubber properties were passed for all Examples 31 to 45.

Next, Table 5 lists results of Examples 46 to 60, in which the first layer and the second layer are formed of Rubber Material D containing 0.25 part by mass of the phenolic resin and containing 0.38 part by mass of the melamine resin.

As listed in Table 5, the adhesive strength was 35 N/cm for Example 46, 31 N/cm for Example 47, 23 N/cm for Example 48, 15 N/cm for Example 49, 10 N/cm for Example 50, 29 N/cm for Example 51, 27 N/cm for Example 52, 22 N/cm for Example 53, 15 N/cm for Example 54, 10 N/cm for Example 55, 20 N/cm for Example 56, 18 N/cm for Example 57, 10 N/cm for Example 58, 0 N/cm for Example 59, and 0 N/cm for Example 60. The rubber properties were passed for all Examples 46 to 60.

It is revealed from the results of Examples 1 to 60 that a larger adhesive strength is achieved by a larger pressure reduction of vacuuming and a higher outer surface temperature of the first layer at the lamination process.

Next, Table 8 lists results of Comparative Examples 1 to 10, in which the first layer and the second layer are formed of Rubber Material E that do not contain the thermosetting resin.

As listed in Table 8, the adhesive strength was 34 N/cm for Comparative Example 1, 30 N/cm for Comparative Example 2, 22 N/cm for Comparative Example 3, 15 N/cm for Comparative Example 4, 10 N/cm for Comparative Example 5, 20 N/cm for Comparative Example 6, 18 N/cm for Comparative Example 7, 10 N/cm for Comparative Example 8, 0 N/cm for Comparative Example 9, and 0 N/cm for Comparative Example 10. The rubber properties were passed for all Comparative Examples 1 to 10.

When Comparative Examples 1 to 10 and Examples 1 to 60 are compared with each other for cases with the same magnitude of the pressure reduction of vacuuming and the same outer surface temperature of the first layer, it is revealed that the adhesive strength of Examples 1 to 60, in which the first layer and the second layer are formed of Rubber Materials A to D containing the thermosetting resin, is larger than the adhesive strength of Comparative Examples 1 to 10, in which the first layer and the second layer do not contain the thermosetting resin. For example, in a comparison in a case in which the magnitude of the pressure reduction of vacuuming is 0.07 MPa and the temperature of the outer surface of the first layer is 100° C., the adhesive strength of Example 1, in which the first layer and the second layer contain 1.5 parts by mass of the phenolic resin and contain 2.25 parts by mass of the melamine resin, is larger than the adhesive strength of Comparative Example 1, in which the first layer and the second layer do not contain the thermosetting resin, by 10 N/cm.

Next, Table 9 lists results of Comparative Examples 11 to 25, in which the first layer and the second layer are formed of Rubber Material F containing 2 parts by mass of the phenolic resin and containing 3 parts by mass of the melamine resin.

As listed in Table 9, the rubber properties were not passed for all Comparative Examples 11 to 25. It is considered that this is because in the first layer and the second layer the contents of the phenolic resin and the melamine resin as the thermosetting resin were extremely large, and thus crosslinking of the thermosetting resin itself or cross-linking between the thermosetting resin and ethylene-propylene-diene progressed.

Next, Table 6 lists a result of Example 61, in which the first layer is formed of Rubber Material G, which contains the nitrile rubber as the rubber component and 1 part by mass of the phenolic resin and 1.5 parts by mass of the melamine resin, and the second layer is formed of Rubber Material H, which contains the chloroprene rubbers as the rubber component and 1 part by mass of the phenolic resin and 1.5 parts by mass of the melamine resin. Table 6 also lists results of Comparative Examples 26 and 27, in which the first layer is formed of Rubber Material I, which contains the nitrile rubber as the rubber component and does not contain the thermosetting resin, and the second layer is formed of Rubber Material J, which contains the chloroprene rubbers as the rubber component and does not contain the thermosetting resin.

As listed in Table 6, the adhesive strength was 25 N/cm for Example 61, 10 N/cm for Comparative Example 26, and 5 N/cm for Comparative Example 27. The rubber properties were passed for all the cases. It is revealed that Example 61, which is different from Examples 1 to 60 in the rubber components of the first rubber material and the second rubber material, contains the thermosetting resin even with the changed rubber component and can thus maintain a relatively large adhesive strength between the first layer and the second layer. It is revealed that Example 61, in which the first layer and the second layer contain the thermosetting resin, is larger in adhesive strength than Comparative Examples 26 and 27, in which the two layers do not contain the thermosetting resin, by 15 N/cm or more.

The present invention is useful as a method for manufacturing a laminated rubber hose.

What is claimed is:

1. A method for manufacturing a laminated rubber hose that includes a first layer and a second layer laminated on an outer surface of the first layer,
   the first layer being formed from a rubber material containing a thermosetting resin in an amount of 2.0 parts by mass or more and 4.0 parts by mass or less relative to 100 parts by mass of a rubber component,
   the second layer being formed from a rubber material containing a thermosetting resin in an amount of 2.0 parts by mass or more and 4.0 parts by mass or less relative to 100 parts by mass of a rubber component,
   the method comprising laminating the second layer on the outer surface of the first layer without using an adhesive with the outer surface of the first layer maintained at a temperature range of 65° C. or more and 105° C. or less, wherein:
   the first layer includes an ethylene-propylene-diene rubber as the rubber component,
   the second layer includes an ethylene-propylene-diene rubber as the rubber component,
   the thermosetting resin contained in the first layer and the second layer includes at least a phenolic resin and a melamine resin,
   at the laminating, vacuuming is performed on the first layer at 0.03 MPa or more and 0.08 MPa or less to make the first layer in an expanded state;
   at least one of the rubber material forming the first layer or the rubber material forming the second layer contains sulfur; and
   the first layer and the second layer adhere at least partially to each other, and adhesive strength between the first layer and the second layer is 25 N/cm or more.

2. The method for manufacturing a laminated rubber hose of claim 1, further comprising
   heating the first layer to make a temperature of the outer surface of the first layer within a temperature range of 65° C. or more and 105° C. or less before the laminating.

3. The method for manufacturing a laminated rubber hose of claim 2, wherein in the heating process, the first layer is heated to make a temperature of the outer surface of the first layer within a temperature range of 85° C. or more and 105° C. or less.

4. The method for manufacturing a laminated rubber hose of claim 2, wherein in the heating process, the first layer is heated to make a temperature of the outer surface of the first layer within a temperature range of 95° C. or more and 105° C. or less.

5. The method for manufacturing a laminated rubber hose of claim 1, further comprising
   preparing the rubber material for the second layer containing the thermosetting resin, wherein
   at the laminating, the second layer is laminated on the outer surface of the first layer from the rubber material for the second layer.

6. The method for manufacturing a laminated rubber hose of claim 1, further comprising
   at the laminating, the second layer is laminated on the outer surface of the first layer with the first layer expanded radially outward.

7. The method for manufacturing a laminated rubber hose of claim 1, wherein the laminated rubber hose further includes a reinforcing yarn layer provided between the first layer and the second layer, the first layer and the second layer adhering to each other through gaps of the yarns adjacent to each other in the reinforcing yarn layer.

8. The method for manufacturing a laminated rubber hose of claim 1, wherein adhesive strength between the first layer and the second layer is 30 N/cm or more.

9. The method for manufacturing a laminated rubber hose of claim 1, wherein adhesive strength between the first layer and the second layer is 40 N/cm or more.

* * * * *